(12) United States Patent
Chu et al.

(10) Patent No.: US 6,467,313 B1
(45) Date of Patent: Oct. 22, 2002

(54) METHOD FOR CONTROLLING DOPANT PROFILES

(75) Inventors: Polly W. Chu, Wilmington, NC (US); Lisa A. Moore, Corning; Michelle D. Pierson-Stull, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 48 days.

(21) Appl. No.: 09/590,987

(22) Filed: Jun. 9, 2000

(51) Int. Cl.[7] .................. C03B 37/075; C03C 13/00; G02B 6/00
(52) U.S. Cl. .............. 65/399; 65/378; 65/390; 65/397; 65/398; 65/415; 65/416; 65/417; 65/418
(58) Field of Search .................. 65/378, 390, 397, 65/398, 399, 415, 416, 417, 418

(56) References Cited

U.S. PATENT DOCUMENTS

| | | | |
|---|---|---|---|
| 3,859,073 A | 1/1975 | Schultz | |
| 4,165,223 A | 8/1979 | Powers | |
| 4,263,031 A | 4/1981 | Schultz | |
| 4,289,517 A | 9/1981 | Bailey et al. | |
| 4,453,961 A | 6/1984 | Berkey | |
| 4,486,212 A | 12/1984 | Berkey | |
| 4,616,901 A | 10/1986 | MacChesney et al. | |
| 4,620,861 A | * | 11/1986 | Berkey |
| 4,741,748 A | 5/1988 | Lane et al. | |
| 5,151,117 A | 9/1992 | Bartholomew et al. | |
| 5,236,481 A | * | 8/1993 | Berkey |
| 5,282,079 A | 1/1994 | Laming et al. | |
| 5,526,459 A | 6/1996 | Tanaka et al. | |

OTHER PUBLICATIONS

Kirk–Othmer Concise Encyclopedia of Chemical Technology, (Jacqueline I. Kroschwitz ed., 4th ed. 1999).
John M. Senior, Optical Fiber Communications Principles and Practices (1985), pp. 118–127.

* cited by examiner

Primary Examiner—Michael Colaianni
(74) Attorney, Agent, or Firm—Timothy R. Krogh

(57) ABSTRACT

The present invention discloses novel methods for fabricating glass articles, particularly optical fiber glass preforms, which may contain alumina, yttrium, lanthanum, erbium, or other rare earth metals as dopants. The glass articles made in accordance with the present invention exhibit radially uniform dopant profiles relative to conventional dopant methods. In addition, the overall concentration of the dopant is increased relative to analogous dopant methods.

48 Claims, 4 Drawing Sheets

METHOD FOR CONTROLLING DOPANT PROFILES

The present invention is related to pending U.S. patent application Ser. No. 09/590,981, filed Jun. 9, 2000, the contents of which are incorporated herein in its entirety.

FIELD OF THE INVENTION

The present invention provides a method for controlling the concentration profile of dopants incorporated into a glass article. More particularly, the present invention relates to an improved method of doping an optical fiber preform with dopants that are not readily incorporated during the initial fabrication process.

BACKGROUND OF THE INVENTION

Optical fibers are typically drawn from glass preforms. An optical fiber preform is generally comprised of a central core and an outer cladding layer. The central core, for the most part, has a higher refractive index than the cladding layer. When the preform is drawn into an optical fiber, the difference in refractive indices between the core and cladding layers allows the propagation of the optical signal within the core. Optical fiber preforms and waveguides are composed primarily of high purity silica glass.

Variations in the refractive index are obtained by adding dopants to layers within the central core or surrounding cladding layer. Certain dopants such as the oxides of titanium, germanium, aluminum, and phosphorous are added, in a weight percentage ranging from about 0.1 to 25%, to increase the refractive index of the glass. Other dopants such as fluorine and boron oxide may be added in similar amounts to decrease the refractive index of the glass. A typical optical fiber glass core composition is comprised mainly of high purity $SiO_2$ glass, in a weight percentage above 50%, with lesser amounts of $GeO_2$, $TiO_2$, and/or other dopants, depending upon the desired optical properties.

Glass optical fiber preform can be made from a variety of processes. Typical processes for making these preforms are variations of chemical vapor deposition (CVD) processes such as Outside Vapor Deposition (OVD), Modified Chemical Vapor Deposition (MCVD), or Vapor Axial Deposition (VAD). These processes typically involve the oxidation of glass precursors, such as metal chlorides, to form glass particulate. Glass precursors, such as silicon tetrachloride ($SiCl_4$), germanium tetrachloride ($GeCl_4$), or titanium tetrachloride ($TiCl_4$) which may be liquid at room temperature, are heated within bubblers, vaporizers, or similar means to form a metal chloride vapor. Chlorides are widely used because they vaporize at relatively low temperatures prior to transportation to the reaction zone or a hot zone such as a burner flame, plasma, or heated area within a substrate tube. The chloride vapors oxidize within the reaction zone thereby forming a glass particulate. After a sufficient thickness of particulate is reached, the glass particulate eventually forms the porous soot blank. The porous soot blank is then sintered, or heated until the pores are eliminated, to form a glass preform. In the MCVD process, the formation and sintering of the glass particulate generally occurs simultaneously.

There is also a need to produce optical fibers with dopants such as rare earth and alumina, most of these dopants which are solids at room temperature sublime, rather than boil, to form a vapor. The vapor pressures of these dopants are low at the temperature ranges commonly used for conventional vapor delivery processes, i.e., about 200° C. or below. These properties make it difficult to deliver rare earth, alumina, and other dopants using conventional processes, such as chemical vapor deposition, that are amenable to dopants, such as Ge or Ti, having relatively high vapor pressure precursors.

Yet another problem that occurs in vapor deposition of dopants that sublimate rather than vaporize is the likelihood of bubble formation. Oftentimes, when the dopant system includes solids rather than liquids, solid dopant particles can be carried to the reaction zone by carrier gases during the soot lay-down step. Since the dwell time of solid particles in the heat source or flame is minimal, the solid particles cannot be completely reacted or oxidized. These unreacted solid particles may attach to the glass particulate, or soot, and become incorporated into the soot blank. The particles eventually react and decompose in subsequent processing steps involving elevated temperatures. The decomposition of these solid particles may cause gas bubbles of $Cl_2$, or other gaseous by-products in the resultant preform or preform core.

To alleviate some of these above noted problems, other dopant methods such as solution doping, may be used. These methods, although effective, are also not without drawbacks. In solution doping, such as the process disclosed in U.S. Pat. No. 3,859,073, the porous glass optical fiber preform is immersed within a solution containing the dopant for a period sufficient for the dopant to be incorporated into the blank. The preform is dried for a certain time and then consolidated to form a glass article. Porosity of the preform must be tightly controlled to ensure that the dopant solution can be absorbed into the preform. If the particles within the porous preform are too loosely bound, the preform can disintegrate or crack within the solution. Further, the preform must be thoroughly dried prior to consolidation to avoid cracking or other damage. Thus, the solution doping method requires extra processing steps, adds cycle time, and potentially introduces manufacturing defects into the fiber process.

SUMMARY OF THE PRESENT INVENTION

The novel methods of the present invention control dopant profiles in glass articles comprising at least two dopants. More specifically, the present invention discloses novel methods for doping an optical fiber glass preform or glass article comprising a first dopant, such as $GeO_2$, $TiO_2$, $P_2O_5$, and/or $B_2O_3$, with a second dopant, such as an oxide of Al, Zr, Y, Nb, Ta, Ga, In, Sn, Sb, Bi, the 4f rare earths (atomic numbers 57–71 of the periodic table), Be, Mg, Ca, Zn, Sr, Cd, and Ba, so that the concentration of the second dopant is influenced by the concentration of the first dopant. As a result, the second dopant within the consolidated preform or glass exhibits a radial profile that correlates with, or substantially mirrors, that of the first dopant contained within the initial soot preformn. Further, the extent of radial penetration of the second dopant may be substantially equal to that of the first dopant. Moreover, the concentration of the added second dopant is higher than is expected without the presence of the first dopant.

The methods of present invention provide for the controlled incorporation of a doping chemical species not readily achieved during the initial fabrication of the glass. Accordingly, one aspect of the present invention is directed to methods for making an optical fiber glass preform having a radially uniform dopant profile and the optical fiber made therefrom. A further aspect of the present invention is directed to methods for controlling, or influencing, dopant profiles. Lastly, an additional aspect of the present invention is to effect the extent of radial penetration of the added dopant.

Yet another aspect of the present invention provides methods of improving the concentration of dopants within a glass article utilizing vapor infiltration doping techniques. Vapor infiltration processes provide a solution to incorporating dopants, such as the oxides of Al, Cd, Zn, Zr, Y, Nb, Ta, Ga, In, Sn, Sb, Bi, the 4f rare earths (atomic numbers 57–71 of the periodic table), and the alkaline earths Be, Mg, Ca, Sr, and Ba, into optical fiber glass preforms or cores, that cannot be incorporated, or incorporated with great difficulty, into the glass during the initial formation of the soot blank. The doping cycle occurs after a porous glass blank containing a first dopant, typically $GeO_2$, $TiO_2$, $P_2O_5$, or $B_2O_3$, is formed. The present invention provides methods for improving the dopant profiles, respective dopant concentrations, and degree of dopant penetration through careful tailoring of the amount of $GeO_2$, $TiO_2$, and/or other non-$SiO_2$ oxides present in the porous glass blank.

The vapor infiltration techniques of the present invention comprise placing a previously formed porous glass blank containing a first dopant, such as $GeO_2$, $TiO_2$, or $P_2O_5$, within a furnace that can maintain the blank at a controlled isothermal temperature. A second dopant, such as a metal from the group consisting of Al, Cd, Zn, Zr, Y, Nb, Ta, Ga, In, Sn, Sb, Bi, the 4f rare earths (atomic numbers 57–71 of the periodic table), and the alkaline earths Be, Mg, Ca, Sr, and Ba, is reacted with a halide gas to form a metal vapor. The metal vapor comprising the second dopant infiltrates the porous glass blank containing the first dopant. During the vapor infiltration process, the second dopant preferentially reacts with the first dopant rather than the $SiO_2$ present within the porous glass blank. The concentration and radial profile of the second dopant thereby follows the concentration and radial profile of the first dopant.

In some preferred embodiments, a gas impermeable doping tube is inserted into the central bore of the porous blank or porous cylinder. The doping tube has an open end and a closed end. The closed end of the tube, or dosing tip, may be comprised of a porous material or glass with one or more slots. The dosing tip also contains a reservoir for the metal dopant source. A gas, such as chlorine, flows through the dosing tip and over the metal dopant source thereby reacting with the dopant to form a dopant vapor. The dopant vapor flows through the pores or slots at the end of the tube and infiltrates the pores of the preform. The dosing tip is traversed up and down across the length of the blank. The dosing tip is also rotated about the blank's longitudinal axis. After the dosing step is completed, the blank undergoes drying and sintering procedures to form a fully dense glass which includes the oxide form of the dopants. The glass can then be drawn directly into an optical fiber or coated with an additional glass layer or layers to achieve desired optical properties.

Several important advantages are achieved by making glass articles, such as planar waveguides, optical waveguide preforms, or waveguide core preforms (also referred to as canes or rods), using the methods of the invention. One advantage is an increase in the overall concentration of a second dopant into a glass blank containing a first dopant, such as $GeO_2$ and/or $TiO_2$. A further advantage of the present invention is to effect the penetration of the second dopant that extends radially, i.e. from the center of the preform, to a greater degree than is generally achieved with other known methods. Yet a further advantage of the present invention is providing a cane or preform that exhibits a substantially uniform dopant profile across its radius. These advantages enhance the performance of the optical fiber or planar waveguide for glass optical fiber amplifiers, lightwave optical circuits, or other applications.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention such as its application to other methods of fabricating fiber optic waveguide or preforms and fibers or other refractive index profiles of fibers, will be apparent from the following Detailed Description and the accompanying drawings.

Reference will now be made in detail to a present preferred embodiment of the invention, an example of which is illustrated in the accompanying drawing.

DETAILED DESCRIPTION

The present invention is directed to the treatment of a porous cylinder or soot blank, after the forming or lay down step is complete, that is placed within a consolidation furnace whereby it is doped, dried, and subsequently consolidated to form a non-porous glass body. This non-porous glass body, which can be a preform or a cane, includes the dopant that was supplied within the consolidation furnace.

In one preferred embodiment, the soot or porous preform is made by a chemical vapor deposition process. Fabrication of soot preforms through chemical vapor deposition processes is well known in the art. Some examples of suitable processes are the outside vapor deposition process (also known as the OVD process), the modified chemical vapor deposition process, the plasma-activated chemical vapor deposition process, or the vapor axial deposition process. A more detailed discussion of these processes is provided in *Kirk-Othmer Concise Encyclopedia of Chemical Technology*, (Jacqueline I. Kroschwitz ed., 4th ed. 1999), pp.

824–827 or John M. Senior, *Optical Fiber Communications Principle and Practice* (1985), pp. 118–127 which are incorporated herein by reference. Another suitable OVD process is that disclosed in U.S. Pat. No. 4,453,961 which is incorporated herein by reference in its entirety. However, it is understood that the present invention is applicable to other CVD or glass preform fabrication processes.

Briefly, in the OVD process, at least one coating of particulate glass, or a porous layer of glass soot, is deposited to the outside peripheral surface of a rotating elongated mandrel in a machine called a lathe. The soot particulate layer is formed by oxidation of the glass precursors via flame hydrolysis. Liquid precursors containing silicon, such as $SiCl_4$ alone, or in combination with precursors containing dopants like germanium or titanium, such as $GeCl_4$ or $TiCl_4$, are heated within vessels, such as bubblers or vaporizers, to form its gaseous phase. Chloride-containing sources are preferred because of their favorable vapor pressures. Carrier gases, such as oxygen, nitrogen or an inert gas, are combined with the $SiCl_4$ or other glass precursor gases and then fed through a port on the burner face. The soot is deposited via one or more burners which are translated across the growing soot particulate layer as it rotates on the mandrel. The burner includes additional ports for fuel and oxygen to support the burner and allow the reaction of the glass precursor gases with oxygen to form oxides within a reaction zone.

The soot layers will comprise the core of the preform. Once the soot layers are deposited to a desired thickness, one or more cladding layers may be further applied. The cladding layer may be added directly to the soot core in a soot-on-soot deposition process. In the soot-on-soot process, the vapor deposition process continues in the same fashion as before except the composition of the cladding layer is changed, or the glass precursors are adjusted, to allow the cladding layer to have a different refractive index than the soot core layer.

Alternatively, the cladding layer may be added to a consolidated preform following consolidation of the soot core in a soot-on-glass process. In the soot-on-glass process, the mandrel is removed leaving an essentially hollow, cylindrical soot blank core. The soot blank core is consolidated or sintered to provide a glass blank core having an aperture therethrough. The glass blank core is drawn, in at least one or more steps at a certain temperature to remove the aperture and reduce the diameter, to form a core rod (also known as a core cane). After the drawing step is complete, the cladding layer is deposited via a later deposition step to form an overclad glass preform. The present invention is suitable for either method.

Figure 1:
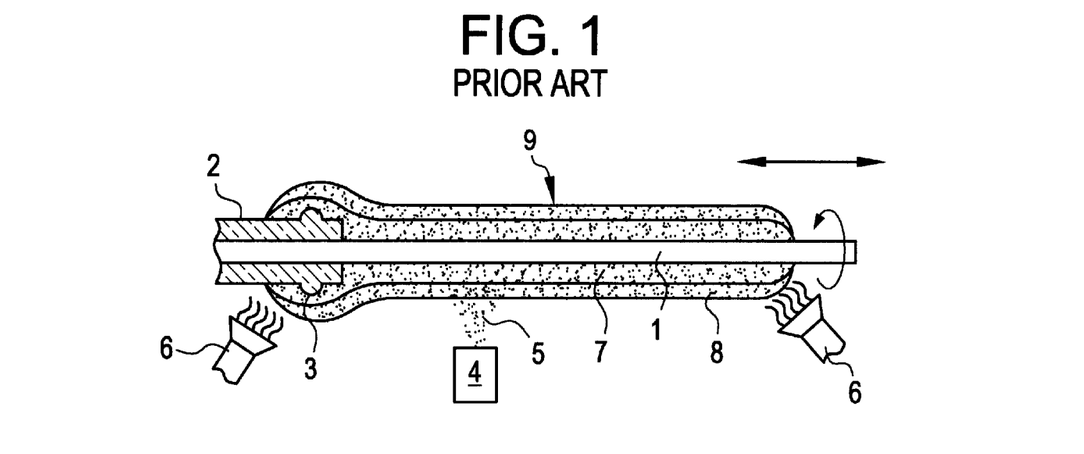
FIG. 1 is a cross sectional view that illustrates the deposition of glass particles or soot onto the surface of a removable, rotating mandrel.

FIG. 1 provides an illustration of a soot blank being formed via such an OVD process. U.S. Pat. Nos. 4,453,961, 4,486,212, and 5,236,481, the contents of which are all incorporated by reference herein in their entireties, also disclose processes for an overclad preform or preform core fabrication. As FIG. 1 shows, the large diameter end of a tapered mandrel 1 is inserted into glass tube 2 having protrusions 3. Shims (not shown) can be used to secure tube 2 to mandrel 1 as disclosed in U.S. Pat. No. 4,289,517. Mandrel 1 is rotated and translated with respect to a burner 4 of the type disclosed in U.S. Pat. No. 4,165,223. One or more burners may be used in this process. In a preferred embodiment of the present invention, the burner 4 traverses across the length of the mandrel at a suitable speed for uniform deposition. In some embodiments of the present invention, a plurality of burners may traverse across the soot blank. Auxiliary burners 6 may optionally be employed in the process to direct flames toward the end of the soot blank, as taught in U.S. Pat. No. 4,810,276, to prevent splitting of the soot preform.

Fuel gas and oxygen or air are supplied to a burner to produce an open flame which is emitted from the burner. The glass precursors may exist as a gas-vapor mixture, or as atomized droplets. Reactant compounds, which comprise the glass precursors, emanate from the burner where they are then oxidized in the reaction zone to form a glass particulate, or soot stream 5, which is directed toward the rotating mandrel 1. The glass precursors may be comprised mainly of silicon chloride with lesser additions of other dopant precursors, such as, but not limited to, germanium or titanium chlorides. These precursors are usually in liquid or vapor form and are heated in bubblers, vaporizers, or similar means to a temperature sufficient to produce a vapor. This vapor is transported through the burner to the reaction zone in front of the burner face by a carrier gas such as oxygen, argon, or other inert gases. Additional dopants, in lieu of, or in addition to germanium may be used to increase or decrease the refractive index of the soot core layer 7 and comprise part of the soot stream, 5. Once the soot layer forming core layer 7 reaches its desired thickness, the glass precursors, oxidized in burner 4 to form the soot stream 5, are changed to form the soot cladding layer 8. Once the soot cladding layer 8 reaches its desired thickness, the soot blank 9 is formed.

The ratio of the soot core layer 7 to the soot cladding layer 8 is referred to as the core/clad ratio of the preform. The core/clad ratio is equal to the diameter of the core divided by the overall diameter of the preform. After the steps of doping, consolidating, and drawing a preform to a 7 mm diameter cane are completed, the extent of doping in the core region, referred to as radius $a_d$, extends to about 0.8 mm, or 800 µm, from the center of the preform. Typical overall diameters for preforms range from about 75 mm to about 115 mm, preferably between about 90 mm to about 100 mm. For optical fiber amplifiers, it is preferred that the rare earth dopant extends throughout the entire core region and even into the cladding. One preferred embodiment, that has exhibited effective doping throughout the core region, is a preform with a core/clad ratio of the soot preform between about 0.14 to about 0.18.

According to one embodiment of the present invention, a soot blank is formed on an apparatus, similar to that depicted in FIG. 1, by depositing silica, germania, and/or other dopant particles onto a rotating mandrel. After deposition of particulate soot material is completed to form a soot blank, mandrel 1 may be removed from the assembly by pulling it out through the tubular handle, leaving a longitudinal aperture through the longitudinal axis of the soot preform. Alternatively, the soot blank or porous cylinder can be formed via a MCVD process or any other known technique.

Regardless of the method of formation, porous soot blanks or porous cylindrical blanks possessing a central aperture are preferred because they allow gases containing the dopant to radially penetrate through the inner diameter of the blank. Further, the porous cylindrical-shaped blank, once dried and consolidated, can be drawn into optical fiber using standard waveguide processes. Accordingly, the present invention is not limited to preforms or blanks made via an outside vapor deposition process and can be extended to a variety of other deposition or glass fabrication processes.

Figure 2:
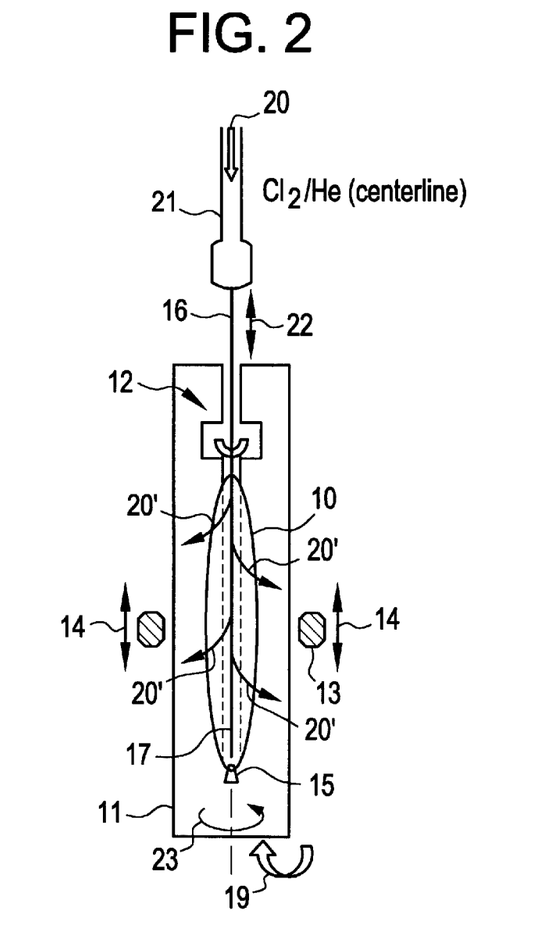
FIG. 2 is a cross sectional view that illustrates an apparatus for doping a preform in accordance with the methods of the invention.

As shown in FIG. 2, the shape of blank 10 preferably is tubular or cylindrically shaped with a central aperture therethrough. The present invention, however, is not limited to any particular geometry of preform or blank. Indeed, any porous glass blank containing $GeO_2$, $TiO_2$, $P_2O_5$, and/or $B_2O_3$ as dopants would be suitable. Blank 10 typically is about 30 cm to about 200 cm in length with a centerline bore diameter between about 6 mm and about 10 mm.

The bulk density of blank 10, or average density of both core and cladding layer, preferably should be about 0.5 $g/cm^3$ or less, to enhance effective infiltration of the dopant. In more preferred embodiments, the bulk density of blank 10 should range from about 0.2 $g/cm^3$ to about 0.4 $g/cm^3$. It should be noted that if blank 10 is overclad, the density of the core region tends to differ than that of the cladding.

The porosity of blank 10, which relates to the volume percentage of the blank not occupied by particulate, preferably should range from about 80% to about 95%, more preferably between about 87% to about 93%.

The particle diameter of the glass particulate comprising blank 10, measured by field emission SEM, may range from about 100 nm to about 200 nm, or more preferably, falls within the lower end of the range, from about 100 nm to about 150 nm.

In one preferred embodiment, the doping cycle is conducted using the method and apparatus disclosed in U.S. Pat. No. 5,236,481 (>481) issued to Berkey and incorporated herein in its entirety by reference. In a more preferred embodiment, the doping cycle is conducted using the method and apparatus illustrated in FIG. 2 and FIG. 3. FIG. 2 provides an illustration of the porous cylindrical blank suspended within the consolidation furnace during the doping process. In one preferred embodiment, the porous soot blank is doped, dried, and consolidated within the consolidation furnace. After the porous soot blank 10 is formed, blank 10 is placed within the muffle 11 of a consolidation furnace by suspending blank 10 from support member 12 as shown. Examples of suitable consolidation furnaces are illustrated in U.S. Pat. Nos. 4,165,223 and 4,741,748 which are incorporated herein by reference in their entireties. A scanning consolidation furnace, such as that disclosed in U.S. Pat. No. 4,741,748, is particularly advantageous because one source of heat is generated by coils, such as the coil 13 shown in FIG. 2, that scan across the length of the blank in the direction indicated by arrows 14. A sharp hot zone can be generated by slowly traversing coil 13 along blank 10 or isothermally heating blank 10 by rapidly reciprocating coil 13. The traverse speed of the coils may vary between about 1500 mm/min to about 3000 mm/min, or more preferably, about 1800 mm/min (also known as the raster mode). Alternatively, the furnace can be moved in a longitudinal direction with respect to blank 10, or blank 10 can moved in a longitudinal direction with respect to the furnace, while coil 13 remains stationary.

The consolidation furnace should allow for temperature control and uniformity across the length of blank 10 over a temperature range from 0° to 1700° C., as well as control and monitoring of the system pressure. Depending upon the melting point of the dopant, the doping range is set below the melting point of the dopant. For example, Al has a melting point of about 660° C., therefore, the doping range is preferably between about 400° C. to about 600° C. It is important that temperature variations be minimized across the length of the blank to ensure uniform vapor infiltration of the dopant.

A tip plug 15 is inserted into the bottom of the aperture of blank 10. Tip plug 15, which can be a silica capillary tube, provides a back-pressure to aid the drying process. Further, tip plug 15 can minimize the burnout of a refractive index increasing dopant such as $GeO_2$ if present in the glass composition.

As shown in FIG. 2, a doping tube 16 is inserted into blank 10. Doping tube 16 is open-ended at the top and may be comprised of gas impermeable glass or a fused silica tube. The doping tube 16 may be inserted into handle 21, as illustrated in FIG. 2. Handle 21 comprises a support member with an open interior to accommodate the insertion of doping tube 16 and a tube to allow gas to flow through its center. The diameter of doping tube 16 is less than the inner diameter of the central aperture of blank 10. In preferred embodiments, the doping tube is cylindrical. A doping tip 17, having a diameter similar to, or less than, doping tube 16, is fused to the end of the doping tube via flame working or other means. Doping tip 17 is close-ended and may be porous or contain a plurality of slots. Doping tip 17 may also be known as a dosing tip. In some embodiments, a porous glass such as Fisher Scientific Glass Gas Dispersion Tube Part No. 3953-12C can be sized and attached to the end of doping tube 16. The doping source 18 is placed inside doping tip 17.

Doping source 18 is a solid metal in the form of a powder or cut pieces of wire or foil, and can comprise one or more dopants. These dopants can include rare earth metal dopants, such as erbium or other 4f metals in the 57–71 series of the periodic table. Additional dopants may also include the Be, Mg, Ca, Zn, Sr, Cd, Ba, Al, Zr, Y, Ta, Ga, In, Sn, Sb, Bi or heavy metal fluorides. In a preferred embodiment, the preform core may be doped with germanium, erbium, and aluminum oxides (i.e., $Er_2O_3$—$Al_2O_3$—$GeO_2$—$SiO_2$ fiber preforms) for optical fiber amplifier applications. The present invention, however, is not limited to any particular composition.

Figure 3:
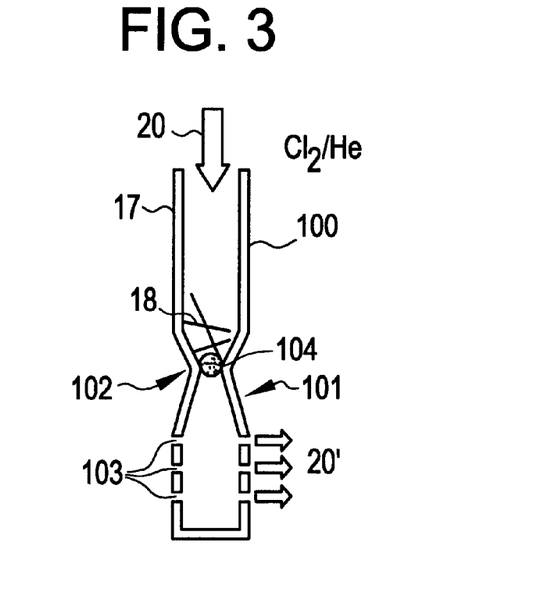
FIG. 3 is a cross sectional view of a dosing tip used in accordance with the methods of the present invention.

In another preferred embodiment that is illustrated in FIG. 3, doping tip 17 can have two chambers 100 and 101. Doping source 18, which may include one or more dopants, is inserted intd a first chamber 100. If co-doping occurs, it is preferred that the dopants selected have similar vapor pressures and melting temperatures.

FIG. 3 shows small wire pieces in first chamber 100 that are used as the dopant for the core of blank 10. Other forms of dopants, such as metal pieces, foils, or powders, may also be used. In preferred embodiments, the walls of chamber 100 are gas impermeable. The second chamber, 101, of doping tip 17 is gas permeable or has a plurality of pores, holes, slots, or slits, 103. Separating first chamber 100 and second chamber 101 is a reduced diameter pinch point 102. Pinch point 102 acts a barrier preventing the passage of unreacted solid dopants 18 from entering into second chamber 101. In some preferred embodiments, a silica chip, 104, is added to act as an additional barrier between first chamber 100 and second chamber 101.

Returning to FIG. 2, arrow 19 represents the upward flow of gas that is fed through the bottom of muffle 11. This gas can be helium, another inert gas, or oxygen, alone or in combination. In preferred embodiments, an upward flow of helium is fed through muffle 11 at a rate ranging from about 20 to about 50 standard liters per minute (slpm), preferably about 40 slpm, during the doping step. In other embodiments, in addition to helium, oxygen is also fed in at a rate of about 1 slpm to about 10 slpm, preferably about 2 slpm. However, it is understood that the invention is not limited to the gases, and flow rates mentioned above. The invention may be practiced by the use of other gases or combination of gases, and/or other flowrates.

In FIG. 2, arrow 20 represents the downward flow of gas through handle 21, doping tube 16 and tip 17, and along the centerline of blank 10. This downward flow of gas dries blank 10 and also reacts with doping source 18. In some embodiments, the downward gas flow is introduced through a tube that fits into the handle of the blank. An example of this handle is shown in U.S. Pat. No. 5,236,481, which is incorporated herein in its entirety by reference. As arrow 20 illustrates, gases, such as a halide gas, preferably chlorine, and/or an inert gas, preferably helium, flow through the centerline of blank 10. In some preferred embodiments, the chlorine gas flows down through the doping tube and tip assembly and blank centerline at a rate ranging from about 20 to about 100 standard cubic centimeters per minute (sccm) or, more preferably about 35 sccm. In other preferred embodiments, helium gas also flows down the centerline of blank 10 at a rate of about 0.25 to about 0.50 slpm, more preferably about 0.30 slpm to about 0.35 slpm. In the most preferred embodiment, the downward flow of gas along the centerline of the blank during the doping step is comprised of about 35 sccm $Cl_2$ and 0.32 slpm He.

Preferably, during the doping step, the doping tube 16 and tip 17 assembly are traversed in a longitudinal fashion, illustrated in FIG. 2 by arrow 22, i.e., up and down the length of blank 10, at a speed ranging from about 1000 mm/min to about 3000 mm/min, preferably at a uniform speed of between about 1500 mm/min to about 2500 mm/min, and even more preferably at a uniform speed of between about 1700 mm/min to about 2000 mm/min. Preferably, the doping tube and tip assembly also is simultaneously rotated, illustrated in FIG. 2 by arrow 23, at a speed ranging from about 0.5 revolutions per minute (rpm) to about 1.5 rpm, preferably about 1.0 rpm. The traversal and rotational movement of the doping tube and tip assembly can occur through the manipulation of the handle 21 or other means. As the doping tube and tip assembly is traversed and rotated, the downward flow, represented by arrow 20, of gas, such as chlorine and helium, passes through the doping tube 16 and tip 17 and reacts with the dopant source 18 to form a dopant vapor, such as a metal chloride. FIGS. 2 and 3 illustrate this vapor as 20'. The dopant vapor flows through the holes or pores of doping tip 17 and infuses into the pores of blank 10, thereby being incorporated into the composition of blank 10.

The doping step, in which the doping source is exposed to the flow of chlorine and/or inert gas, typically is conducted for a duration of about 1 hour. More than one doping cycle can be run to allow for additional doping. Alternatively, co-doping can occur during one doping cycle if the dopants have similar vapor pressures and melting temperatures. A longer doping time may result in a higher concentration of dopant in the blank composition. Doping temperatures are temperatures below the melting point of the solid doping source 18. For instance, in preform compositions containing aluminum, the temperature is kept between about 400° C. and about 600° C., or below the melting temperature of aluminum (Tm=660° C.), to avoid melting the aluminum solid while allowing the aluminum to react with the chloride gas. Since the dopant is formed at the tip of the doping tube, which is in close proximity to the blank, no pre-heating of the dopant gas is required. Further, because the dopant vapor and blank are heated simultaneously within the consolidation furnace, condensation of the dopant vapor at cold spots does not pose a problem as it does in other methods.

The concentration and radial profile of the second dopant is strongly influenced by the presence of the first dopant within the soot blank. The second dopant reacts more readily with the first dopant than with the $SiO_2$ present within the soot blank. This is may be expressed in terms of the Gibbs free energies of the following exemplary reactions measured at 500° C.:

(1) $2\ AlCl_3\ (g) + 1.5\ GeO_2\ (s) \rightleftharpoons Al_2O_3\ (s) + 1.5\ GeCl_4\ (g)$
   $\Delta G_1 = -71.4$ kca (2) $2\ AlCl_3\ (g) + 1.5\ SiO_2\ (s) \rightleftharpoons Al_2O_3\ (s) + 1.5\ SiCl_4\ (g)$
   $\Delta G_2 = -6$ kca The free energy of the first reaction, $\Delta G_1$, is substantially more negative than the free energy of the second reaction, $\Delta G_2$. When the free energy of a reaction becomes negative, the reaction is spontaneous. Moreover, in a system that has a series of competing reactions, the more negative reactions are favored. Therefore, in a system in which the above exemplary reactions are competing, the first reaction, the reaction with $GeO_2$, is preferred over the second reaction, the reaction with $SiO_2$.

In terms of a preferential reaction, the second dopant reacts more readily with the first dopant in comparison to the silica for the reason that the reaction between the second dopant and the first dopant has exhibited a more negative Gibbs free energy than the reaction between the second dopant and the silica.

After the doping step is completed, the doping tube is removed and the blank is attached to handle 21. Blank 10 may then be dried using chlorine drying or analogous means and consolidated using conventional methods known in the art. The steps of drying and consolidating the soot preform may be performed in accordance with the teachings of U.S. Pat. Nos. 4,125,388 and 5,236,481, the contents of which are both incorporated herein by reference. The drying and consolidating steps can be performed separately or simultaneously. Chlorine gas drying may occur at temperatures ranging from about 800° C. to about 1200° C. in order to reduce or eliminate any residual hydroxyl groups that may be present in the soot blank.

In the consolidating or sintering step, the hollow, cylindrical and porous soot blank is collapsed to form a consolidated glass blank having a smaller diameter. The soot blank is heated to a time and temperature sufficient to eliminate particulate boundaries. Traditional sintering steps occur at temperatures of about 1400° C. to 1700° C., preferably between about 1440° C. to 1500° C., while helium or another inert gas is flowed along the centerline of the soot blank at a rate of between about 0.1 slpm and about 0.9 slpm, preferably about 0.6 slpm. The consolidated glass blank comprises, in part, an oxide form of the dopant source or sources.

Figure 4:
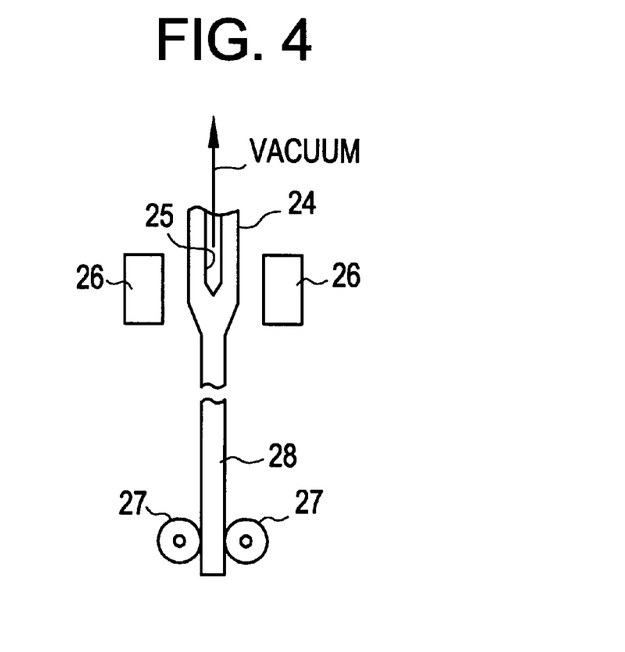
FIG. 4 is a cross sectional view that illustrates the redrawing of a cane from a preform.

Alternatively, the consolidated glass blank can be provided with additional cladding material prior to drawing optical fiber such as in the soot on glass preform process. FIG. 4 shows a typical apparatus for drawing an optical waveguide core, cane, or rod from a consolidated glass blank 24 with a central aperture 25. A furnace 26 heats the lower end of the blank 24 to its softening temperature. A cane or rod drawing mechanism, such as the motor driven tractors 27, draws a cane or rod 28 from the softened end of the blank or preform 24. The diameter of the cane or rod 28 is measured by a measuring device (not shown). As the lower end of the consolidated glass blank 24 is pulled downward, the diameter of the blank 24 decreases, the evacuated aperture 25 collapses and the cane or preform 28 is formed. As FIG. 4 shows, a vacuum pump is generally used during the cane drawing step to aid in closing the central aperture, 25, of the blank 24. The drawing rate may be controlled by an external measuring device to yield a glass cane or preform with a predetermined diameter. This measuring device is generally a non-contact, optical measurement to avoid damage to the pristine surface of the cane after it is drawn. The consolidated glass blank is preferably drawn into a cane or preform that is about 7 mm in diameter.

Once rod 28 is drawn, it is sectioned into smaller lengths and supported within a lathe. The sections of rod 28 act as mandrels for the deposition of cladding glass particulate to form a composite preform. The composite preform is then consolidated and dried within the consolidation furnace muffle to form a fiber draw blank. The fiber draw blank can then be drawn into optical fiber using conventional methods known in the art.

The dopant radial profile of vapor doped preforms or glass of the present invention is substantially more uniform than those preforms made from methods of the prior art. It has been discovered that the radial profiles for the dopants incorporated into the porous or soot blank by the methods of the present invention may be controlled or tailored by adjusting the concentration of the first dopant, $GeO_2$, $TiO_2$, or other non-$SiO_2$ oxides, present in the soot composition. In particular, the radial dopant profile of the second dopant, correlates to, substantially mirrors, or exhibits similar areas of high concentration, as the radial dopant profile of the first dopant in the soot composition. Further, the extent of radial penetration, or $a_{d2}$, of the second dopant through the core and into the cladding layer is determined by the extent of radial penetration of the first dopant, or $a_{d1}$. Moreover, these methods also result in an overall increase in dopant concentration of the added dopants in the resultant glass.

The amount of germania present in a preferred preform or cane will depend upon the desired refractive index profile of the core of the fiber made therefrom. A germania content of about 0.1% to about 25% by weight, preferably about 10% to about 20% by weight, and even more preferably from about 16% to about 18% by weight, can be used to make an erbium doped amplifier fiber.

The alumina content of a preferred preform or cane can vary from about 0.5% to about 20% alumina by weight, or more preferably from about 0.5% to about 10% by weight, depending on the fiber amplifier requirements. The alumina may be increased in the glass core composition and extended into the cladding to achieve suitable waveguiding properties. In another embodiment, the preform core may also contain a weight percentage of about 300 to about 800 ppm, preferably about 500 ppm, of the rare earth metal erbium.

The amount of titania present in the glass article or preform will depend upon its desired application. Titania is typically added to cladding glass compositions in amounts ranging from about 0.1% to about 25% by weight.

In some embodiments, the present method can be used to form a preform core that may be doped with germanium, erbium, and aluminum oxides (i.e., $Er_2O_3$—$Al_2O_3$—$GeO_2$—$SiO_2$ fiber preforms) for optical fiber amplifier applications. Three different optical fiber amplifier preform compositions, which contain differing amounts of erbium, alumina, and germania dopants in the preform core, may be prepared in accordance with the present invention and their compositions are reflected in Table I.

TABLE I

| Fiber: | $Al_2O_3$ (Wt. %): | $Er_2O_3$ (ppm): | $GeO_2$ (Wt. %): | $SiO_2$ (Wt. %): |
|---|---|---|---|---|
| Type 1 | 0.7–1.2 Preferably 1.0 | 300–800 Preferably 500 | 20 | Balance |
| Type 2 | 1.8–4.5 Preferably 2.5 | 300–800 Preferably 500 | 18 | Balance |
| Type 3 | 4.5 or greater Preferably 8–10 | 300–800 Preferably 500 | 12–14 | Balance |

The enhanced optical properties of higher aluminum containing fibers are well known in the art. Fibers, such as the Type 3 fiber, will exhibit more desirable optical properties in comparison to fibers with lesser amounts of aluminum, such as the Type 1 fiber. For example, the Type 3 fiber exhibits a lower ripple value than a Type 1 fiber. Ripple value reflects the difference between the minimum gain peak and the maximum gain peak divided by the minimum gain peak within a wavelength range of between about 1525 nm and about 1575 nm. The Type 3 fiber also flattens the gain spectrum when an optical signal is propagated over its length. In addition, the Type 3 fiber has a broadened operating wavelength span, or expanded bandwidth, in comparison to the Type 1 fiber.

The following examples illustrate the manner in which the method of the present invention can be employed to incorporate oxides into the cores of optical fibers.

EXAMPLE 1

A soot blank, comprised of about 8 wt % $GeO_2$ and about 92 wt % $SiO_2$, was prepared using a standard OVD process. The soot blank, which had a step index profile, had a length of about 70 cm, a centerline bore diameter of approximately 9.5 mm (or about ⅜"), and an open handle. The bulk density of the blank was 0.328 g/cc. A scanning consolidation furnace was preheated to a temperature range between about 400° C. to about 600° C. The soot blank was attached to a handle and then suspended about 1.5 m from the top of the furnace by hanging the handle on a customized cup, or lower support member, which is fused to a rod that extends above the furnace. A solid silica tip plug was placed at the end of the center aperture of the soot preform to prevent doping vapor from escaping during the doping step.

A silica doping tube was prepared using two lengths of tubing provided by Quartz Scientific, #QT4D. The tubing had an 8 mm outer diameter and a 4 mm inner diameter. The two lengths of tubing were fused together and then flame worked to a ⅜" standard silica OVD handle. The total length of the combined tubing and handle was about 2 m.

An additional 600 mm to 700 mm length of tubing, comprising the doping tip, is fused to the tubing at the end opposite to the handle. The doping tip forms two chambers separated by a crimped area, or pinch point. One chamber contains the doping source or sources. The other chamber has a plurality of slots cut into it with a diamond saw. The slotted area of the chamber was approximately 89 mm long and began about 25 mm above the sealed end. The pinch point separating the two chambers was formed by placing the slotted tube onto a glass working lathe. The slotted tube was heated until glowing via a hand torch and pulled to a reduced diameter. After the pinch point is formed, the chamber containing the plurality of slots was sealed. A porous silica chip was placed upon the pinch point to prevent the solid doping source from entering the slotted chamber.

Annealed aluminum wire pieces (Alfa Aesar, #10747-G5, purity 99.999%), about 5 mm to about 10 mm in length and 1.0 mm in diameter, were placed into the first chamber of the doping tip. The aluminum wire pieces weighed between about 1.0 g to about 1.5 g. The aluminum wire was cut into small pieces to allow for a high surface area thereby promoting the reaction of the wire with the chloride gas. The doping tip was attached to the handle section via flame working. The doping tip is replaced after each doping cycle.

The doping tube was placed in the furnace handle. Two marks were placed on the doping tube. One mark related to the position at which the doping tip was at the blank tip. The other mark indicated the position the doping tip was at the blank handle. The doping tip was then traversed between these two marks by manually controlling the furnace downdrive control box.

The doping step occurred for a duration of 1 hour. The furnace temperature was initially 532° C. at the start of the doping cycle, decreased to 490° C. mid-cycle, and finished at 440° C. at the completion of the cycle. During the doping cycle, a constant downward flow of 35 sccm $Cl_2$ and 0.32 slpm He gas passed through the furnace handle and along the centerline of the soot blank. At the same time, an upward flow of about 2 slpm $O_2$ gas and about 40 slpm He gas passed through the muffle of the furnace. A total of about 1.0801 g of Al wire reacted during the 1 hour doping cycle.

After the doping cycle was completed, a purge cycle was run for about 5 minutes and then the doping tube, lower support member, and soot blank was removed. The solid tip plug at the aperture of the blank was removed and replaced with a consolidation tip plug. The doped blank was then hung from the furnace handle and relowered into the consolidation furnace to be dried and consolidated. A 55 minute dry hold was conducted in which 66 sccm $Cl_2$ gas and 640 sccm He gas was flowed down the centerline and 40 slpm He gas was flowed through the muffle. The furnace temperature setpoint for the drying step was 810° C. (the actual furnace temperature was 905° C.) and the scanner coil rastered at 1800 mm/min. The ramp phase was comprised of a 10 minute heat up without $Cl_2$ gas flow to a 1240° C. setpoint while the scanning coil of the furnace was at the bottom, or home position, of the furnace. A 2 minute pre-sinter step, in which the coil was heated to about 1490° C. or 28.5% power in the home position, was then conducted. Lastly, a single upward sintering pass of the coil was conducted at a temperature of 1490° C. and a scanning rate of about 9 mm/min. The muffle gas continued to flow during the consolidation step. The consolidated glass blank appeared opaque along its entire length. The opacity indicated the presence of the oxidized dopant within the glass composition.

After the consolidation step was completed, the blank was hot transferred to the redraw step. The redraw step is conducted in a redraw tower such as that illustrated in FIG. 4. The redraw step involved heating one end of the elongated, consolidated glass preform to a gob temperature setpoint of 2125° C. and a run temperature setpoint of 2030° C. The blank is fed into the furnace at a rate of about 9.85 mm/min, and the cane or cane drawing mechanism draws the cane at a rate of about 320 mm/min. The torque applied during redraw was equal to 8.3 in/lbs. A vacuum pressure of about 100 torr or below is applied along the centerline of the glass blank to facilitate minimizing the center aperture and driving off residual water within the blank. The opacity of the glass cleared upon redraw. The resultant drawn cane was 1 meter in length and 7 mm in diameter.

Figure 5:
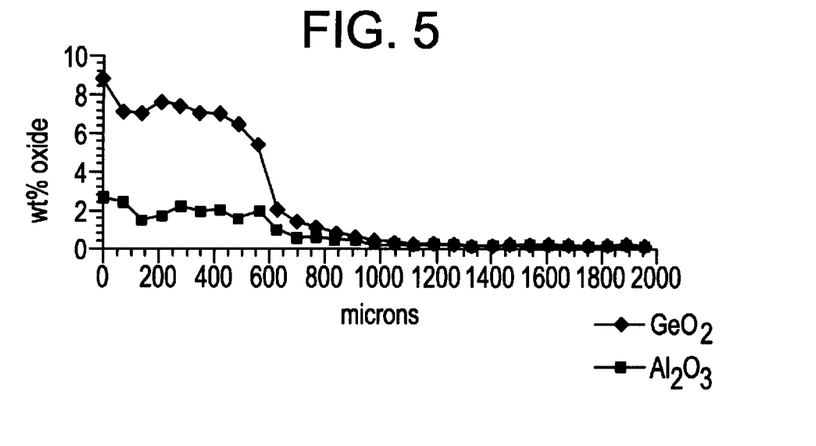
FIG. 5 illustrates the radial profile of an approximately 2 wt. % $Al_2O_3$-8 wt. % $GeO_2$—$SiO_2$ step index preform.

FIG. 5 provides the electron microprobe data of one section of the consolidated and redrawn cane. The electron microprobe analysis was conducted on a cross-sectional sample of each cane in accordance with conventional methods known in the art. The analysis was performed on a JEOL Superprobe 733, which is an electron probe microanalyzer manufactured by JEOL, Ltd. of Akishima, Japan. The x-axis of each figure represents the radial distance from the center of the glass cane or preform expressed in microns. The y-axis relates to the weight percentage of oxide concentration relative to the overall glass composition. As FIG. 5 illustrated, a first plateau of approximately 2 wt % of $Al_2O_3$ extended to approximately 600 microns. The profile of the 2 wt % $Al_2O_3$ plateau mirrored the profile of the 8 wt % $GeO_2$ within the core region. In addition, a second $Al_2O_3$ plateau of 0.5 wt % extended to about 900 microns.

EXAMPLE 2

Except for differences specified below, a process similar to Example 1 was used to form an $Al_2O_3$—$GeO_2$ doped, step index profile optical fiber preform. A soot blank comprising approximately 16 wt % $GeO_2$ (or double the $GeO_2$ content as Example 1) was formed using an OVD process. The blank had a bulk density of 0.322 g/cc. During the doping step, the parameters for the gas flow down the centerline line remained the same as in Example 1. However, the upward flow of He gas through the muffle was doubled to 40 slpm and the flow of $O_2$ through the muffle was omitted. For the 1 hour doping cycle, the furnace temperature was 567° C. at the start of the doping cycle, decreased to 464° C. mid-cycle, and finished at 410° C. by the cycles completion. Almost all of the original 1.106 g of Al wire was consumed during the doping cycle.

Figure 6:
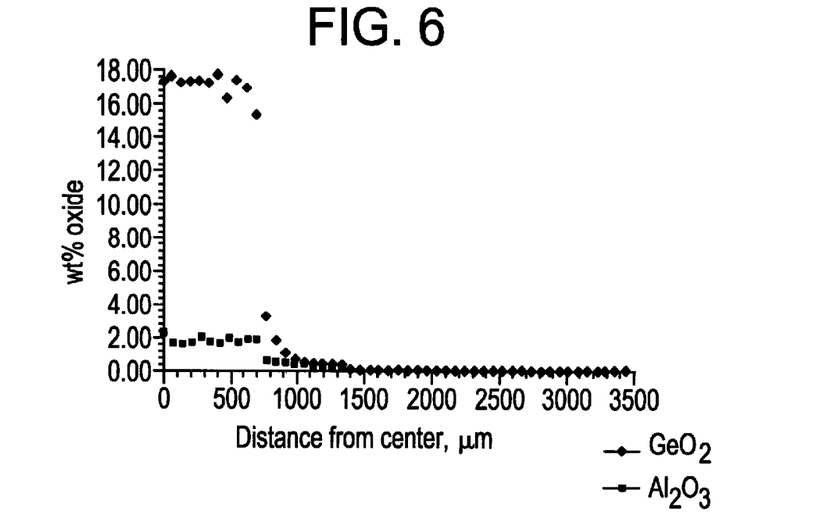
FIG. 6 illustrates the radial profile of an approximately 2 wt. % $Al_2O_3$-16 wt. % $GeO_2$—$SiO_2$ step index preform.

FIG. 6 provides the electron microprobe data for a cane of the consolidated and redrawn glass. Referring to FIG. 6, the cane shows an approximately 2 wt. % $Al_2O_3$ plateau that extends radially about 800 microns from the center of the consolidated preform. This coincided with the plateau for approximately 16–18 wt% $GeO_2$. The drop in $Al_2O_3$ concentration to 0 wt. % coincides with the drop of $GeO_2$ concentration to 0 wt. %. Thus, the and of $Al_2O_3$, or extent of dopant penetration through the core, is substantially equal to the and of $GeO_2$.

EXAMPLE 3

Except for the differences specified below, a process similar to Example 1 was used to form an $Al_2O_3$—$SiO_2$ preform and an $Al_2O_3$ —$_{GeO2}$—$SiO_2$ preform.

For the $Al_2O3$—$SiO_2$ preform, the $SiO_2$ soot blank, which was formed via an OVD process, had a bulk density of 0.330 g/cc. The doping cycle was conducted for a time duration of 1 hour. The furnace temperature was initially 515° C. at the start of the doping cycle, decreased to 454° C. mid-cycle, and finished at 395° C. at the completion of the cycle. During the doping cycle, a constant downward flow of 35 sccm $Cl_2$ and 0.32 slpm He gas passed through the furnace handle and along the centerline of the soot blank. At the same time, an upward flow of about 40 slpm He gas passed through the muffle of the furnace. A total of about 1.1035 g of Al wire reacted during the 1 hour doping cycle. The drying and consolidation steps were the same as in Example 1. The consolidated glass was clear, indicating low $Al_2O_3$ retention. The glass was then re-drawn and sectioned into canes for electron microprobe analysis.

Figure 7:
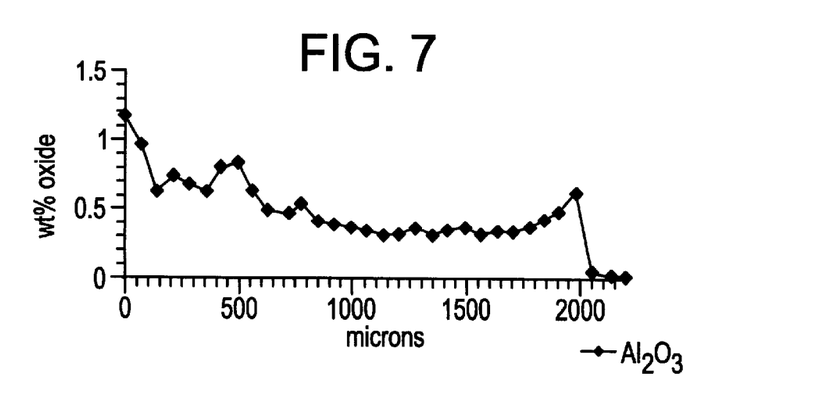
FIG. 7 illustrates the radial profile of an $Al_2O_3$—$SiO_2$ preform.

FIG. 7 provides the results of electron microprobe analysis for the $Al_2O_3$ doped $SiO_2$ preform. The centerline $Al_2O_3$ peak was 1.2 wt %. As FIG. 7 further illustrates, after a distance of about 500 microns from the center of the preform, the $Al_2O_3$ peak plateaus at about 0.5 wt %. This plateau extends to about 2000 microns.

For the $Al_2O_3$—$GeO_2$—$SiO_2$ preform, the $GeO_2$ doped $SiO_2$ soot blank, which was formed via an OVD process, had an average or bulk density of 0.319 g/cc. The doping cycle was conducted for a time duration of 1 hour. The furnace temperature was initially 434° C. at the start of the doping cycle, increased to 500° C. mid-cycle, and finished at 450° C. at the completion of the cycle. During the doping cycle, a constant downward flow of 35 sccm $Cl_2$ and 0.32 slpm He gas passed through the furnace handle and along the centerline of the soot blank. At the same time, an upward flow of about 40 slpm He gas passed through the muffle of the furnace. A total of about 1 gram of Al wire reacted during the 1 hour doping cycle. The drying and consolidation steps were the same as in Example 1. The consolidated glass was opaque from the mid-section of the blank to the handle end. The glass was then re-drawn and sectioned into canes for electron microprobe analysis.

Figure 8:
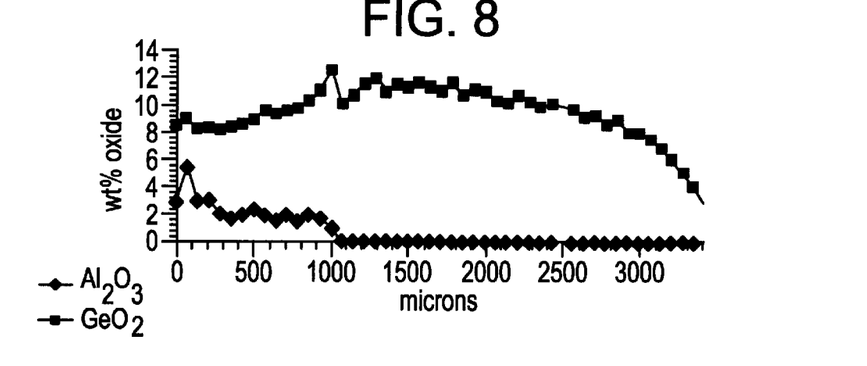
FIG. 8 illustrates the radial profile of an $Al_2O_3$—$GeO_2$—$SiO_2$ preform.

FIG. 8 provides the results of electron microprobe analysis for the $Al_2O_3$ and $GeO_2$ doped $SiO_2$ preform. The centerline $Al_2O_3$ peak was approximately 3.0 wt. %. As FIG. 8 further illustrates, after a distance of about 300 microns from the center of the preform, the $Al_2O_3$ peak plateaus at about 2.0 wt %. This plateau extends to about 1000 microns before dropping to 0 wt %. The $GeO_2$ concentration shows a profile depression that coincides with the $Al_2O_3$-doped region. Additionally, the $GeO_2$ concentration increases slightly as $Al_2O_3$ concentration drops to 0 wt. %.

A comparison of FIG. 7 and FIG. 8 shows that the presence of $GeO_2$ in the soot blank increases the dopant concentration of $Al_2O_3$. This indicates that there is a preferential reaction between $Al_2O_3$ and $GeO_2$ rather than $Al_2O_3$ and $SiO_2$ in the soot blank.

EXAMPLE 4

Except for the differences specified below, a process similar to Example 1 was used to form an $Al_2O_3$—$TiO_2$—$SiO_2$, parabolic profile optical fiber preform. A soot blank comprising approximately 1.5 wt % $TiO_2$ was formed using an OVD process. The doping cycle was conducted for a time duration of 1 hour. The temperature of the furnace during the doping cycle was approximately between 400° C. and 600° C. During the doping cycle, a downward flow of 35 sccm $Cl_2$ gas and 0.32 slpm He gas flowed through the centerline and an upward flow of 40 slpm He gas passed through the furnace muffle. Approximately 1.0649 gram of Al reacted during the doping cycle.

The consolidation step consisted of a 1 hour drying step and a shorter time duration sintering step. During the drying step, a continuous flow of 0.9 slpm $Cl_2$ gas and 9 slpm He gas passed through the muffle. During the sintering step, a continuous flow of 2 slpm $O_2$ gas and 2 slpm He gas passed through the muffle. Temperatures for the drying and sintering step were the same as in Example 1. The coil traverse rate during the sintering step was 1800 mm/min.

Figure 9:
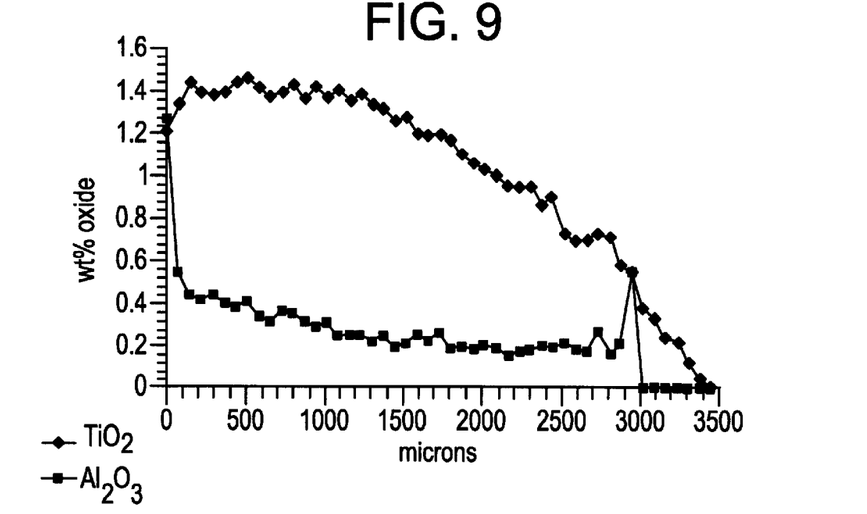
FIG. 9 illustrates the radial profile of an $Al_2O_3$—$TiO_2$—$SiO_2$ parabolic preform.

The length of the parabolic profile preform was 50 cm. Since the length of the preform was shorter, more traversing passes occurred during the doping cycle. FIG. 9 provides the radial profile of a consolidated and redrawn cane obtained via electron microprobe. Like FIGS. 5 though 8, the x-axis related to the distance in microns from the center of the cane, and the y-axis related to the weight percentage of the oxide. As FIG. 9 shows, the decrease in $Al_2O_3$ concentration followed a relatively similar path as the decrease in $TiO_2$ concentration. The similarity in radial dopant concentration reflects a preferential reaction between $Al_2O_3$ and $TiO_2$, rather than between $Al_2O_3$ and $SiO_2$, in the glass composition.

EXAMPLE 5

A soot blank, comprised of about 8 wt % $GeO_2$ and about 92 wt % $SiO_2$, was prepared using a standard OVD process. The soot blank, which had a step index profile, had a length of about 70 cm, a centerline bore diameter of approximately 9.5 mm (or about ⅜"), and an open handle. The bulk density of the blank was 0.342 g/cc. A scanning consolidation furnace was preheated to a temperature range between about 400° C. to about 600° C. The soot blank was attached to the gas conducting handle disclosed in U.S. Pat. No. 5,236,581 (>481 patent) issued to Berkey and incorporated herein by reference. Annealed aluminum wire pieces (Alfa Aesar, #10747-G5, purity 99.999%), about 5 mm to about 10 mm in length and 1.0 mm in diameter, were placed within a reservoir inside the gas conducting handle. The aluminum wire pieces weighed between about 1.0 g to about 1.5 g. The aluminum wire was cut into small pieces to allow for a high surface area thereby promoting the reaction of the wire with the chloride gas. A solid silica tip plug was placed at the end of the center aperture of the soot preform to prevent doping vapor from escaping during the doping step.

The doping cycle occurred for a duration of 1 hour following the vapor infiltration method disclosed in the >481 patent. During the doping cycle, a downward flow of 35 sccm $Cl_2$ gas and 0.32 slpm He gas flowed through the centerline and an upward flow of 40 slpm He gas passed through the furnace muffle. Approximately 1.0 grams of Al wire contained within the gas conducting handle reacted during the doping cycle.

After the doping cycle was completed, a purge cycle was run for about 5 minutes. The solid tip plug at the aperture of the blank was removed and replaced with a consolidation tip plug. A 55 minute dry hold was conducted in which 35 sccm $Cl_2$ gas and 30 sccm $O_2$ gas was flowed down the centerline and 0.4 slpm $O_2$ gas was flowed through the muffle. The furnace temperature setpoint for the drying step was 810° C. (the actual furnace temperature was 905° C.) and the scanner coil rastered at 1800 mm/min. The ramp phase was comprised of a 10 minute heat up without $Cl_2$ gas flow to a 1240° C. setpoint while the scanning coil of the furnace was at the bottom, or home position, of the furnace. A 2 minute pre-sinter step, in which the coil was heated to about 1490° C. or 28.5% power in the home position, was then conducted. Lastly, a single upward sintering pass of the coil was conducted at a temperature of 1490° C. and a scanning rate of about 9 mm/min. Muffle gas consisting of 0.4 slpm $O_2$ and 40 slpm He flowed during the consolidation step. After the consolidation step was complete, the consolidated glass blank was removed and examined. The consolidated blank appeared milky along its entire centerline and opaque in the upper portions of the blank. The opacity of the glass indicates the presence of the oxidized dopant within the glass composition. The opacity of the glass cleared upon redraw.

Figure 10:
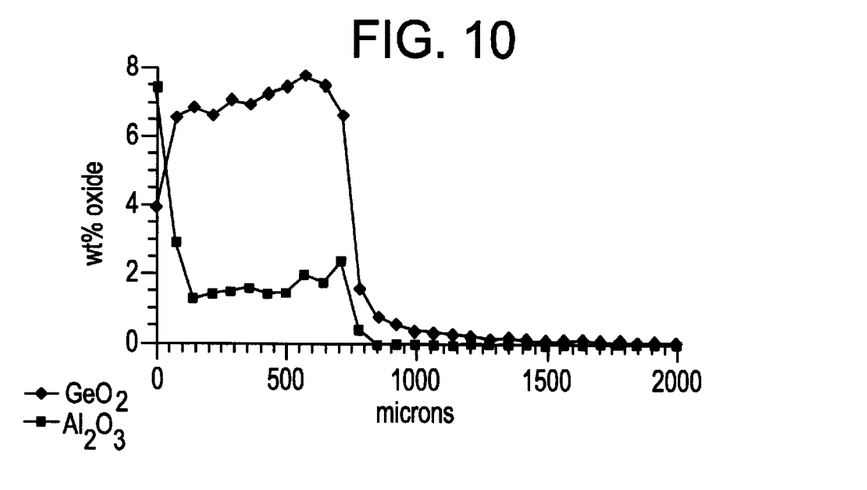
FIG. 10 illustrates the radial profiles of an approximately 2 wt. % $Al_2O_3$-8 wt. % $GeO_2$—$SiO_2$ step index preform in which vapor infiltration occurred using the method disclosed in U.S. Pat. No. 5,236,481.

FIG. 10 provides the results of electron microprobe analysis for the $Al_2O_3$ and $GeO_2$ doped $SiO_2$ preform that was vapor infiltrated in accordance with the method disclosed in the >481 patent. The centerline $Al_2O_3$ peak was approximately 7.3 wt. %. As FIG. 10 further illustrates after a distance of about 100 microns from the center of the preform, the $Al_2O_3$ peak plateaus at about 2.0 wt. %. This plateau coincides with the dopant profile of $GeO_2$ in the core. The concentration of $GeO_2$ also drops to 0 wt. % at about 900 microns. Thus, the and of $Al_2O_3$ is substantially equal to the ad of $GeO_2$. Further, there is a higher Al level in the Ge-doped core region than in the $SiO_2$ clad region. Moreover, this seems to indicate a preferential reaction between $Al_2O_3$ and $GeO_2$, rather than $Al_2O_3$ and $SiO_2$ during the vapor infiltration process or doping cycle.

The present invention is directed to methods of making doped articles, that include, but are not limited to, single mode and multi-mode optical fiber waveguides and devices made therefrom, regardless of any specific description in the drawings or examples set forth herein. It will be understood that the present invention is not limited to use of any of the particular glass compositions or temperature ranges discussed herein. Indeed, the invention includes improving the longitudinal and/or radial profile in various doped compositions. Further, the apparatus disclosed in the present invention can be used with the method of the present invention or other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A method of controlling concentration of dopant in a glass article comprising at least two dopants, said method comprising the steps of:
   a. forming a porous soot blank, said blank comprising a first dopant; and
   b. adding a second dopant, wherein a Gibbs Free Energy of a reaction between said second dopant and said first dopant comprises a more negative value than a Gibbs Free Energy of a reaction between said second dopant and silica, to said blank by vapor infiltration;
wherein the concentration of the second dopant in said soot blank is higher than is expected without the pressure of the first dopant.

2. The method of claim 1 wherein said glass article is an optical fiber preform.

3. The method of claim 2, where said preform comprises a first dopant with a radial penetration, $a_{d1}$, and a said second dopant with a radial penetration, $a_{d2}$, wherein the $a_{d2}$ of said second dopant is substantially equal to the $a_{d1}$ of said first dopant.

4. The method of claim 1 wherein said first dopant is at least one member selected from the group consisting of $GeO_2$, $TiO_2$, and $P_2O_5$.

5. The method of claim 1 wherein said second dopant comprises at least one metal selected from the group consisting of Al, Zr, Y, Nb, Ta, Ga, In, Sn, Sb, Bi, the 4f rare earths (atomic numbers 57–71 of the periodic table), Be, Mg, Ca, Zn, Sr, Cd, and Ba.

6. The method of claim 5 wherein said second dopant comprises Al.

7. The method of claim 5 wherein said second dopant comprises Y, La, or Ca.

8. A method of controlling concetration of dopant in a glass preform comprising at least two dopants, said method comprising the steps of:
   a. forming a porous soot blank, said blank comprising a first dopant; and
   b. adding a second dopant to said blank by vapor infiltration wherein said second dopant preferentially reacts with said first dopant, instead of silica,
wherein said preform comprises a radial penetration of said first dopant, $a_{d1}$, and a radial penetration of said second dopant, $a_{d2}$, wherein the $a_{d2}$ of said second dopant is substantially equal to the $a_{d1}$ of said first dopant.

9. The method of claim 8 wherein said first dopant is at least one member selected from the group consisting of $GeO_2$, $TiO_2$, and $P_2O_5$.

10. The method of claim 8 wherein said second dopant comprises at least one metal selected from the group consisting of Al, Zr, Y, Nb, Ta, Ga, In, Sn, Sb, Bi, the 4f rare earth (atomic numbers 57–71 of the periodic table), Be, Mg, Ca, Zn, Sr, Cd, and Ba.

11. The method of claim 10 wherein said second dopant comprises Al.

12. The method of claim 10 wherein said second dopant comprises Y, La, or Ca.

13. The method of claim 8 wherein the concentration of the second dopant in said soot blank is higher than is expected without the presence of the first dopant.

14. A method of improving radial profiles of an optical preform comprising at least two dopants, said method comprising the steps of:
   a. forming a soot blank having interconnective pores, said blank comprising a first dopant;
   b. heating said blank in a furnace to a first temperature;
   c. transforming said second dopant to a dopant vapor that flows into said pores of said blank; and
   c. sintering said blank to a second temperature sufficient to substantially eliminate said pores and form said optical preform, comprising said first dopant having a first radial profile and a radial penetration, $a_{d1}$, and said second dopant having a second radial profile and a radial penetration, $a_{d2}$, such that the radial profile of said second dopant comprises substantially the same as the radial profile of said first dopant.

15. The method of claim 14 wherein said first dopant is at least one member selected from the group consisting of $GeO_2$, $TiO_2$, and $P_2O_5$.

16. The method of claim 14 wherein said first temperature is below the melting temperature of said second dopant.

17. The method of claim 14 wherein said second dopant is at least one metal selected from the group consisting of Al, Zr, Y, Nb, Ta, Ga, In, Sn, Sb, Bi, the 4f rare earths (atomic numbers 57–71 of the periodic table), and the alkaline earths Be, Mg, Ca, Zn, Sr, Cd, and Ba.

18. The method of claim 14 wherein said dopant vapor comprises a halide.

19. The method of claim 18 wherein said halide is chlorine.

20. The method of claim 14 wherein said second temperature is greater than said first temperature.

21. The method of claim 14 wherein said second temperature is between about 1400° C. and about 1700° C.

22. The method of claim 14 wherein said optical preform has said radial penetration $a_{d2}$ substantially equal to said radial penetration $a_{d1}$.

23. A method of improving radial profiles of a glass comprising at least two dopants, said method comprising the steps of:
   a. forming a porous glass cylinder, said cylinder comprising a first dopant;
   b. heating a porous glass cylinder to a first temperature;
   c. inserting an apparatus into said porous glass cylinder, said apparatus comprising a impervious first chamber that contains a second dopant, and a permeable second chamber;
   d. exposing said second dopant in said first chamber to a gas to form a dopant vapor, that flows out of said first chamber into said second chamber, and out of said second chamber into said porous glass cylinder;
   e. consolidating said porous glass cylinder at a second temperature to form glass comprising said first dopant having a first radial profile and said second dopant having a second radial profile, such that the radial profile of said second dopant substantially mirrors that radial profile of said first dopant; and
   f. rotating said apparatus within said porous glass cylinder and traversing said apparatus across the length of said porous glass cylinder.

24. The method of claim 23 wherein said exposing step, said rotating step, and said traversing step are conducted simultaneously.

25. The method of claim 23 wherein said first dopant is at least one member selected from the group consisting of $GeO_2$, $TiO_2$, and $P_2O_5$.

26. The method of claim 23 wherein said first temperature, in said heating step, is below the melting temperature of said second dopant.

27. The method of claim 23 wherein said apparatus is a silica tube.

28. The method of claim 23 wherein the second chamber is porous.

29. The method of claim 23 wherein the second chamber has a plurality of slots.

30. The method of claim 23 wherein the second dopant is at least one metal selected from the group consisting of Al, Zr, Y, Nb, Ta, Ga, In, Sn, Sb, Bi, the 4f rare earths (atomic numbers 57–71 of the periodic table), Be, Mg, Ca, Zn, Sr, Cd, and Ba.

31. The method of claim 23 wherein the gas comprises a halide gas.

32. The method of claim 23 wherein said second temperature is higher than said first temperature.

33. A method of making a glass preform comprising at least two dopants and having a substantially uniform radial profile, said method comprising the steps of:
  a. forming a glass blank having interconnective pores and an aperture therethrough, said glass blank comprising a first dopant;
  b. inserting a doping apparatus into said aperture of said glass blank, said doping apparatus comprising a second dopant and a plurality of holes;
  c. heating said glass blank and said doping apparatus to a temperature below the melting temperature of said second dopant;
  d. exposing said second dopant to a gas to form a dopant vapor, said dopant vapor passing through said plurality of holes to said glass blank;
  e. heating said glass blank to consolidate it into a non-porous body comprising said first dopant having a first radial profile and a radial penetration $a_{d1}$ and said second dopant having a second radial profile and a radial penetration $a_{d2}$; and
  f. rotating said apparatus within said porous glass cylinder and traversing said apparatus across the length of said porous glass cylinder.

34. The method of claim 33 further comprising the step of drawing said non-porous body into an optical fiber.

35. The method of claim 33 wherein said exposing step, said rotating step, and said traversing step are conducted simultaneously.

36. The method of claim 33 wherein said first dopant is at least one member selected from the group consisting of $GeO_2$, $TiO_2$, and $P_2O_5$.

37. The method of claim 33 wherein said glass blank has a bulk density of about 0.5 $g/cm^3$ or less.

38. The method of claim 33 wherein said glass blank has a bulk density between about 0.2 $g/cm^3$ and about 0.4 $g/cm^3$.

39. The method of claim 33 wherein said glass blank has a porosity between about 80% and about 95 volume %.

40. The method of claim 33 wherein said second dopant is at least one metal selected from the group consisting of Al, Y, Zr, Nb, Ta, Ga, In, Sn, Sb, Bi, the 4f rare earths (atomic numbers 57–71 of the periodic table), Be, Mg, Ca, Zn, Sr, Cd, and Ba.

41. The method of claim 40 wherein said second dopant comprises Al.

42. The method of claim 33 wherein said gas comprises a halide.

43. The method of claim 33 wherein said gas comprises chlorine.

44. The method of claim 33 wherein said second dopant profile substantially mirrors said first radial profile.

45. The method of claim 33 wherein said radial penetration $a_{d2}$, in said heating step, is substantially equal to said radial penetration $a_{d1}$.

46. The method according to claim 1 further comprising placing said second dopant in a two chamber apparatus within the porous blank, rotating the two chamber apparatus with the porous blank, and traversing the apparatus across a length of the porous blank.

47. The method according to claim 8 further comprising placing said second dopant in a two chamber apparatus within the porous blank, rotating the two chamber apparatus with the porous blank, and traversing the apparatus across a length of the porous blank.

48. The method according to claim 14 further comprising placing said second dopant in a two chamber apparatus within the soot blank, rotating the two chamber apparatus with the soot blank, and traversing the apparatus across a length of the soot blank.

* * * * *